Nov. 8, 1927.  1,648,842
H. A. DENMIRE
METHOD AND APPARATUS FOR APPLYING FABRIC TO TIRE BUILDING CORES
Filed July 11, 1924  2 Sheets-Sheet 2

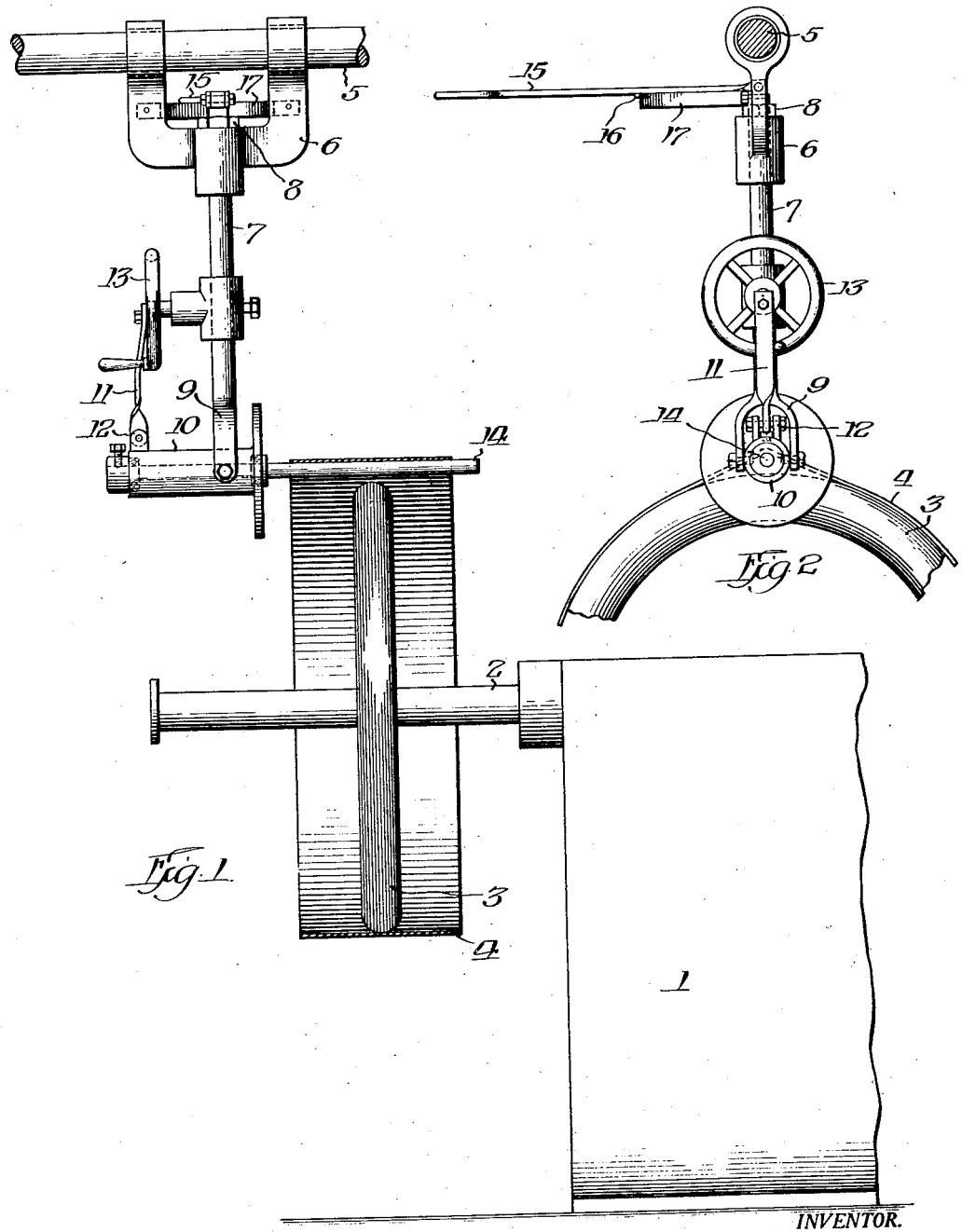

INVENTOR.
Harold A. Denmire,
BY
ATTORNEY.

Patented Nov. 8, 1927.

1,648,842

UNITED STATES PATENT OFFICE.

HAROLD A. DENMIRE, OF AKRON, OHIO, ASSIGNOR TO THE GENERAL TIRE AND RUBBER COMPANY, OF AKRON, OHIO, A CORPORATION OF OHIO.

METHOD AND APPARATUS FOR APPLYING FABRIC TO TIRE-BUILDING CORES.

Application filed July 11, 1924. Serial No. 725,397.

This invention relates to the art of manufacturing pneumatic tires and particularly to that part of the process which involves the application of the fabric to the core.

In the application of tire fabric to the core, it is a common practice to make up one or more layers of the rubberized fabric (cord or square woven) into bands which are applied to the core. These bands are of a circumference of a predetermined percentage less than the circumference of the core so that the required stretch will be imparted to the band as it is placed over the core.

The present invention relates to a new and improved method of applying the bands to the core and the apparatus therefor, the device being extremely simple in operation and design and effective for the purposes set forth.

The present application shows one form of the invention only, it being understood that other forms of the invention may be resorted to without departure from the essential features as will be set forth.

The method shown and claimed herein is similar to that shown and described in my copending application Serial No. 695,930, filed February 29, 1924, of which this application is a continuation in part.

In the drawings:

Figure 1 is a side elevation of a machine equipped with the new band applying apparatus;

Figure 2 is a front view;

Figure 3:
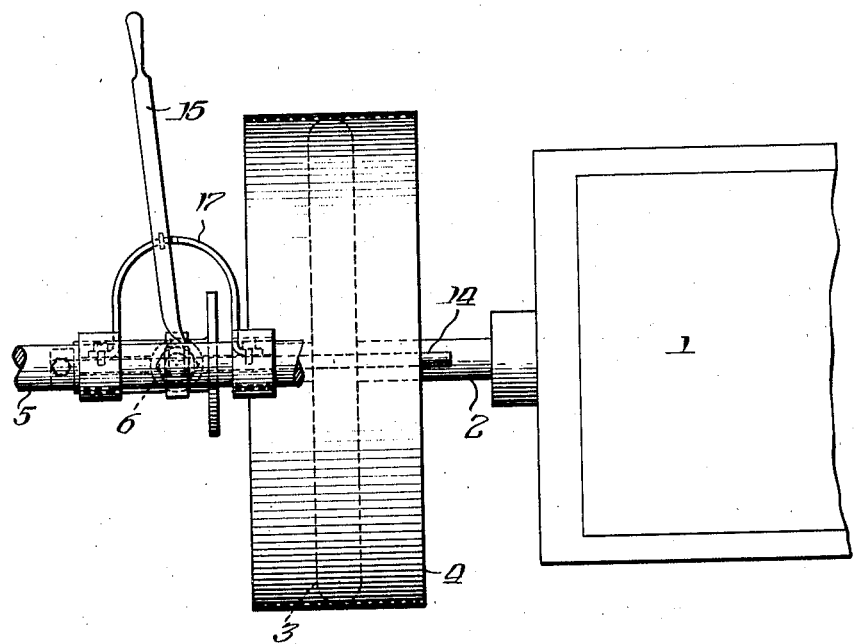
Figure 3 is a plan.

In the drawings, 1 represents the frame of a tire making machine which is provided with the usual rotary shaft 2 carrying the core 3. The shaft is arranged to be driven by any suitable mechanism as will be understood by those familiar with the art.

The band of fabric to be placed upon the core is indicated by the numeral 4. This may be one or more plies of fabric and is usually of the cord fabric type. It is made up from strips of bias cut fabric, so as to be stretchable, and is less in circumference than the outer diameter of the core so that the required or desired degree of stretch will be imparted to the fabric by its application about the crown of the core.

The apparatus for applying the bands to the core is extremely simple and effective for the purpose. It is constituted in a shifter bar which is mounted so as to be movable toward and away from the core and is also mounted so as to be movable in several positions which will give the results desired.

The apparatus embodies a support or guide 5 which is in the form of a rail or bar arranged in general parallelism to the shaft upon which the core is mounted. Upon the support is slidably carried a yoke 6 in which is pivotally mounted a vertical rock shaft 7 supported from the yoke by a nut 8. The lower end of the shaft 7 is provided with a fork 9 in which is pivotally mounted a sleeve or bearing 10. The sleeve is adapted to be held in any adjusted position by a link 11, the lower end of which is pivoted between lugs 12 at the rear of the bearing and the upper end of which is pivoted slightly off the center of the hand wheel 13. When the link 11 is in its lowermost position, the sleeve is substantially horizontal. When it is moved upwardly, the sleeve is tilted downwardly toward the core.

The sleeve 10 carries the shifter bar which is in the form of an elongated rod or shaft 14, mounted on ball-bearings within the sleeve, and which extends forwardly and projects over the core to intersect the plane of rotation when the carriage is moved to the proper position on the rail 5.

The vertical shaft 7 is adapted to be rocked in the bearing in the yoke 6 by means of a hand lever 15 so that the shaft 14 can be placed at an angle to the plane of the core, in which position a lug 16 on the lever 15 rests in a notch in the arc-shaped guide 17 attached to the carriage 6. A second notch may be provided to maintain the rod perpendicular to the plane of the core.

Figure 4:
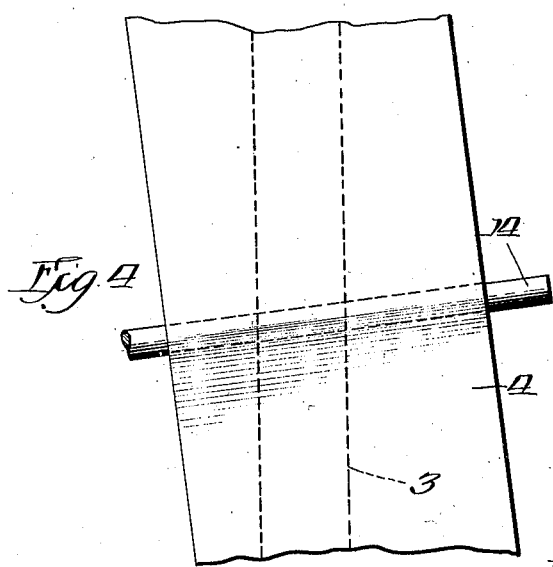
Figure 4 is an enlarged view showing the manner in which the device operates to place the band upon the core.

The operation of the device is as follows:

The core being in condition to receive the fabric and the carriage 6 being located on the guide rail 5 in a position remote from the core, a band of fabric is hung upon the shaft 14. The lever 15 is adjusted to place the shaft at an angle to the plane of the core, as indicated in Figure 4, and the carriage is moved toward the core. The band is now attached to the core at one point by the sticky rubber coating on the fabric and the core started in rotation. As the shaft projects over the core and is arranged at an acute angle to the direction of rotation, the fabric will be lifted from the outer periphery of the core and shifted by the rotation of the core. In this manner the band of fabric is quickly and easily applied and centered upon the core, the operator readily learning when to stop the core so that the band is centrally located thereon. Should the band be fed too far over the core, a reversal of the shaft 14 will serve to draw it backward.

When the band is placed in position, the shaft can be tilted downwardly and turned until it is perpendicular to the plane of the core so that it can be withdrawn from within the band.

The operation of the device is very simple, and while the description of the apparatus and process have been somewhat detailed, changes and modifications may be made within the scope of the invention as defined by the claims appended hereto.

What is claimed is:

1. In the process of manufacturing tire casings, the steps of forming a band of fabric of smaller circumference than the outer circumference of the core, attaching the band to the core and simultaneously stretching the band and moving it laterally to a position about the core by a force applied angularly to the plane of rotation of the core over the width of the band.

2. In the process of manufacturing tire casings, the steps of forming a band of fabric of smaller circumference than the outer circumference of the core, attaching the band to the core, rotating the band and the core, lifting the band from the core at one point and simultaneously shifting the band axially of the core by a force applied across the band angularly to the plane of rotation of the core.

3. In the process of manufacturing tire casings, the steps of forming a band of fabric, attaching the band to the core, simultaneously stretching the band and moving it laterally to a position about the core by a force applied angularly to the plane of rotation of the core over the width of the band.

4. In the process of manufacturing tire casings, the steps of attaching a band of fabric to the core, rotating the band and the core, lifting the band from the core at one point and simultaneously shifting the band axially of the core by a force applied across the band angularly to the plane of rotation of the core.

5. Apparatus for the manufacture of tire casings, comprising a rotary core, a carriage movable toward and from the core, a shifter bar intersecting the central plane of the core, and means for supporting the shifter bar upon the carriage so that it is directed at an angle to the plane of the core.

6. Apparatus for the manufacture of tire casings, comprising a rotary core, a carriage movable toward and from the core, a shifter bar and means for supporting the shifter bar upon the carriage so that it intersects the central plane of the core at an angle.

7. Apparatus for the manufacture of tire casings, comprising a rotary core, a shifter bar and means for supporting the shifter bar so that it will intersect the central plane of the core at an angle.

8. Apparatus for the manufacture of tires, comprising a rotary core, a shifter bar and means for supporting the shifter bar so that it intersects the central plane of the core and lies outside of the circumference of the core and is arranged at an acute angle to the direction of rotation of the core.

9. Apparatus for applying fabric bands to cores in the manufacture of tires, comprising a rotary core and a shifter for the fabric arranged at an angle to the plane of the core and extending from a point at one side of the core to a point beyond the central plane of the core.

10. Apparatus for applying fabric bands to cores in the manufacture of tires, comprising a rotary core and a shifter member for the fabric arranged at an angle to the plane of the core across the central plane and outside of the circumference of the core.

11. Apparatus for the manufacture of tires, comprising a rotary core, a support, a shifter bar on the support and intersecting the plane of the core, and means for changing the angle of the shifter bar relative to the plane of the core both horizontally and vertically.

12. Apparatus for placing tire bands about cores, comprising a guide rail, a support movable upon the guide rail, a vertical rock shaft on the support, a horizontal bearing sleeve pivoted to the rock shaft, and a shifter bar extending outwardly from the bearing and adapted to intersect the plane of the core.

13. Apparatus for placing tire bands about cores, comprising a guide rail, a support shiftable upon the guide rail toward and from the core, a vertical rock shaft in the support, means for operating said rock shaft and locking it in position, a pivoted bearing sleeve upon the rock shaft, means for moving the bearing sleeve, and a shifter bar extending outwardly from the bearing and adapted to intersect the plane of the core.

14. Apparatus for applying bands to cores, comprising a shifter bar and a mounting for said shifter bar to support it between the band and the core and at an angle to the plane of rotation of the core and intersecting the central plane thereof.

15. Apparatus for applying fabric bands to cores in the manufacture of tires, comprising a shifter bar and a movable mounting for said shifter bar to support it between the band and the core and at varying angles to the plane of rotation of the core and intersecting the central plane thereof.

HAROLD A. DENMIRE.